United States Patent [19]

Waters et al.

[11] 4,380,806
[45] Apr. 19, 1983

[54] METHOD AND APPARATUS FOR SHEAR WAVE LOGGING

[75] Inventors: Kenneth H. Waters, Oakland, Calif.; John R. Hopkins; Charles E. Payton, both of Houston, Tex.

[73] Assignee: Conoco Inc., Ponca City, Okla.

[21] Appl. No.: 131,814

[22] Filed: Mar. 19, 1980

[51] Int. Cl.³ ............................ G01V 1/40; G01V 1/36
[52] U.S. Cl. ........................................ 367/27; 367/31; 367/75; 73/598
[58] Field of Search ............... 367/25, 27, 31, 32, 367/41, 75; 364/422; 73/598

[56] References Cited

U.S. PATENT DOCUMENTS

| | | | |
|---|---|---|---|
| 3,281,773 | 10/1966 | Newman | 367/27 |
| 3,302,164 | 1/1967 | Waters et al. | 367/75 |
| 3,311,875 | 3/1967 | Geyer et al. | 367/41 |
| 3,330,375 | 7/1967 | White | 367/25 |
| 3,340,953 | 9/1967 | Temanek | 367/75 |
| 3,354,983 | 11/1967 | Erickson et al. | 367/75 |
| 3,475,722 | 10/1969 | White | 367/911 |
| 3,683,326 | 8/1972 | White | 367/75 |
| 3,794,976 | 2/1974 | Michler | 367/75 |
| 3,962,674 | 6/1976 | Howell | 367/41 |
| 4,210,966 | 7/1980 | Ingram | 367/31 |

OTHER PUBLICATIONS

Pichitt, "Acoustic Character Logs and Their Applications in Formation Evaluation", 6/63, pp. 659-667, Journal of Petroleum Technology.

*Primary Examiner*—Nelson Moskowitz
*Attorney, Agent, or Firm*—William J. Miller

[57] ABSTRACT

A method and apparatus for shear wave logging which utilizes relatively high frequency sweep control transmission and subsequent correlation of received signals in order to define travel times of horizontally polarized shear and/or torsional wave energy. The apparatus includes specific sonde structure for effecting firm contact of transmitting and receiving elements with the borehole wall.

3 Claims, 4 Drawing Figures

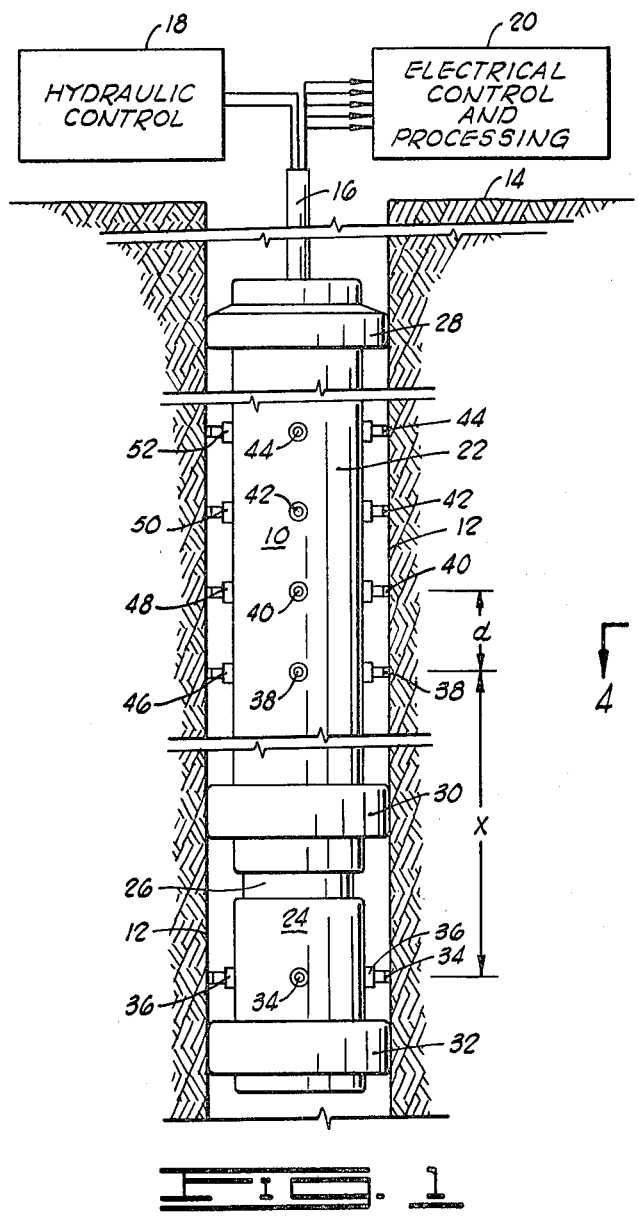
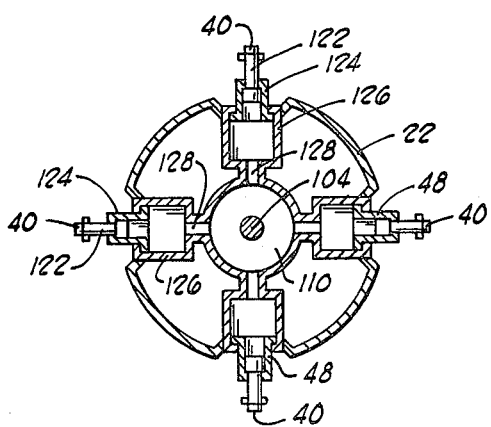
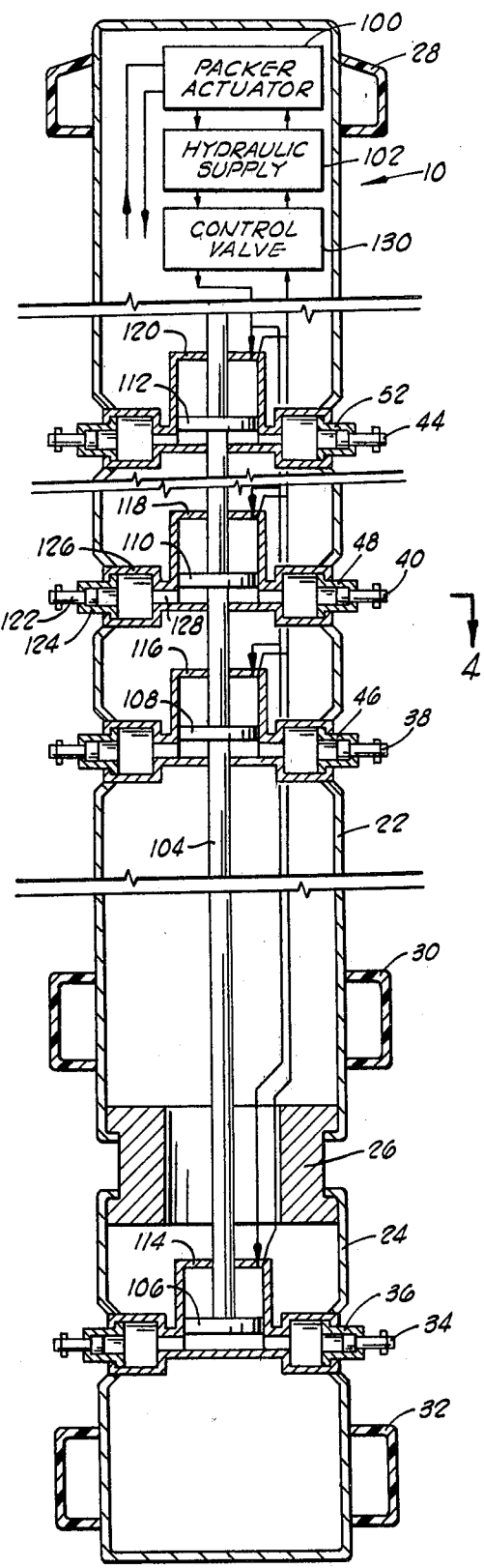

METHOD AND APPARATUS FOR SHEAR WAVE LOGGING

BACKGROUND OF THE INVENTION

1. Field of the Invention

The invention relates generally to borehole logging utilizing shear and/or torsional wave propagation to derive data relative to acoustic wave transit times in formations adjacent the borehole.

2. Description of the Prior Art

The prior art includes numerous types of acoustic energy logging tools that may be used for data collection along a borehole. The previous shear wave logging tools have not been designed for the sole detection of shear wave travel times along the vertical dimension, and most of the acoustic logging tools used today need mud or water-filled holes in order to function. Presently used logging tools have two opposed transmitters and two opposed receivers thereby to eliminate hole caving effects and miscentering of the tool. The magnetostriction-type transmitting transducers generate pulses on the order of 17 to 25 microseconds in width at a rate of around 20 times per second. Hence, compressional waves are created in the borehole fluid which in turn generate formation compressional as well as shear, fluid, and boundary waves. The detected signals then reflect this character as the returned signal indications show compressional and shear waves from the formation, and boundary and fluid waves of greater or lesser travel times. Thus, shear wave velocities in the formations surrounding boreholes can only be determined by either electronically or visually sorting the shear wave arrival time at the detectors from the multitude of other waves that are also received at the detectors.

U.S. Pat. No. 3,794,976 in the name of Mickler teaches the generation of high frequency shear waves for transmission through adjacent formations with subsequent detection to derive information about the borehole wall and the immediate formations therearound. This teaching utilizes a short burst of relatively high frequency acoustic energy as input to the formation with detection in the same horizontal plane through the borehole. The return signals derived then provide measurements which may be likened to characteristic anomalies such as fractures in the earth formation immediately adjacent the borehole. Another U.S. patent in the name of White, U.S. Pat. No. 3,683,326, teaches an echo ranging device utilizing vertically displaced detectors and transducers, the data from which may be further processed to detect certain inhomogeneities located near the borehole. The method and apparatus of this invention are directed toward cancellation of interfering fluid-borne signals and other direct transmission signals through detector polarity discrimination by signal combination.

SUMMARY OF THE INVENTION

The present invention relates to improvements in borehole logging using acoustic energy and as such utilizes transducer and detector combinations which are direct coupled to the borehole wall to respectively generate and detect horizontally polarized shear and/or torsional wave energy that is induced in response to a relatively high frequency sweep control signal, detected energy then being correlated with the control signal to derive output travel times for data compilation. The logging tool is a characteristic type of downhole tool carrying a plurality of seismic wave transducers as well as a plurality of seismic wave receivers at designated locations therealong. Hydraulic elements are included for actuation to place the respective transducers and receivers into firm contact with the borehole wall, thus eliminating fluid and direct transit effects, whereupon the transducers generate seismic wave input to the earth formation adjacent the borehole in response to a control signal of preselected frequency and duration; and, the received energy indications are then correlated against the input control signal to determine the energy travel times with increased resolution and reliability.

Therefore, it is an object of the present invention to provide shear wave formation velocities as a function of depth in a borehole in order to relate shear wave reflection events from seismic shear wave subsurface explorations to the stratigraphic layers that cause the events.

It is also an object of the present invention to provide improved borehole logging apparatus that eliminates signal processing problems stemming from fluid-borne waves and boundary wave propagation along the borehole.

Finally, it is an object of the present invention to provide an indication of shear wave velocity having greater resolution.

Other objects and advantages of the invention will be evident from the following detailed description when read in conjunction with the accompanying drawings which illustrate the invention.

BRIEF DESCRIPTION OF THE DRAWINGS

FIG. 1 is a view in side elevation of a borehole logging tool, constructed in accordance with the invention, as it may be situated within a borehole;

FIG. 3 is a vertical section of the logging tool with part shown in block diagram; and FIG. 4 is a section taken along lines 4—4 of FIG. 3.

DETAILED DESCRIPTION OF THE INVENTION

Figure 2:
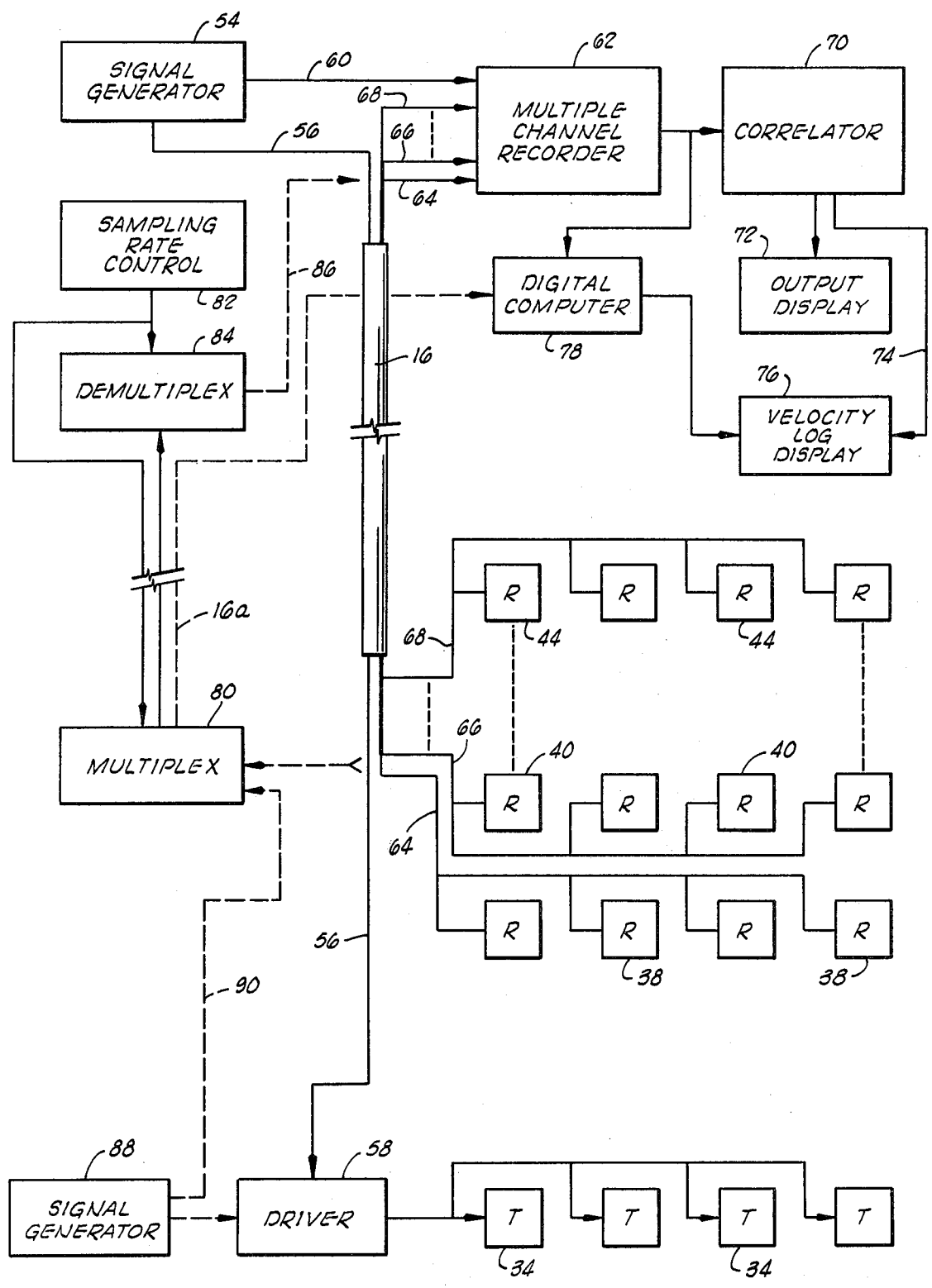
FIG. 2 is a block diagram of the shear wave logging apparatus of the present invention.

Referring to FIG. 1, a logging tool 10 is illustrated in operative position within a borehole 12 as formed at earth surface 14. The logging tool 10 is suspended and moves within borehole 12 by means of a well-known type of control cable 16 including cable connections to hydraulic control 18 and the electrical control and processing circuitry 20 as located at the surface. A specialized cable connector providing a greater number of conductors than standard type may be utilized.

The logging tool 10 is formed from a tubular frame 22 coupled to a lower frame 24 by means of an acoustic isolating connector 26, and it may include a plurality of hydraulic actuated packers, e.g. packer elements 28, 30 and 32 as placed along tubular frames 22 and 24. The packer elements may be any of the conventional forms, hydraulic, flexible steel, etc. as thus might be adapted for use with logging tool 10. The lower frame housing 24 includes a plurality of telescopically positionable shear wave transmission transducers 34. While two such transducers 34 may be utilized in opposed alignment, the present disclosure proceeds with utilization of four quadrature-arrayed transducers 34 each being positionable in firm contact against the wall of borehole 12 by means of telescopic hydraulic support cylinders 36.

The shear wave transducers 34, the transmitter elements, may be any of the well-known and commercially available ceramic or magnetostrictive devices which are effective in the supersonic frequency range over which the present invention operates, i.e. from 20 up to about 100 kilohertz. Transducers 34 are preferably low Q devices enabling adequate energy transmission over a relatively wide frequency band, e.g. 20 to 80 kilohertz.

The receiver elements are disposed at spaced distances along logging tool 10 in plural arrays, shown in this case as a quadrature array at each level. Thus, quadrature arrays of receiver transducers 38, 40, 42 and 44 are supported by telescopic hydraulic cylinders 46, 48, 50 and 52, respectively, for placement in firm contact with the wall of the borehole 12. The receiver arrays are each spaced a distance d apart along the length of the upper portion of logging tool 10 and the lowermost array of receivers 38 is disposed a selected distance X from the array of transmitters 34. The receiver transducers 38–44 may also be selected from known and commercially available transducer elements such as ceramic, magnetostrictive, etc. and these too are selected to have low Q and relatively wide band response characteristics. While the logging tool of FIG. 1 is depicted as having four levels of receiver array, it should be understood that the number and spacing d of receiver arrays will vary in accordance with the exigencies of the field application, the length of logging tool 10, and other considerations that may arise regarding signal processing.

FIG. 2 is a block diagram of the surface and downhole electronics associated with the logging tool 10. Also included is an alternative form of connection utilizing signal multiplexing, a desirable alternative when all high frequency factors are considered, and as will be further described. The energizing sweep signal is generated at the surface in a suitable signal generator 54. The signal generator 54, e.g. a standard form of general purpose computer, may serve as a digital signal constructor to generate a control signal similar to that utilized for surface geophysical operations but at increased frequency ranges. The generated control signal, preferably 20 to 80 kilohertz and sweeping over at least two octaves, is conducted via line 56 down logging cable 16 to provide control input to a driver 58. The driver 58 along with other of the downhole electronics may be suitably disposed in a selected void space within the logging tool 10. A control signal replica from signal generator 54 is also input on line 60 to a multiple channel recorder 62 for purposes of correlation, as will be further described. Output from driver 58 upon actuation then energizes each of the transmitters 34 to impart horizontal shear seismic wave energy into the borehole wall and this in effect sets up a torsional shear wave, i.e. it has the effect of twisting the borehole.

Each of the individual receiver arrays, receivers 38, 40, 44, etc. are connected to provide a composite output of signal return along the respective leads 64, 66 and 68, and this signal return is conducted via control cable 16 up to the surface for input to the multiple channel recorder 62. Thus, selective outputs from multiple channel recorder 62, including the control signal replica, may be input to a correlator 70 of well-known type as used in the geophysical art but adapted for the higher frequency correlation. A special purpose computer or pre-programmed microprocessor may be well adapted for correlation at the required speeds. Correlator 70 may then be utilized to correlate the individual composite signal returns from the quadrature arrayed receiver groups relative to the control signal input on line 60 to provide a seismic shear wave travel time indication for each of the laterally arrayed receiver groups. Output from correlator 70 may then be applied directly to a suitable form of output display 72, e.g. an oscilloscope, camera display, etc., or it may be output via line 74 to a specialized form of velocity log display 76. Alternatively, output from multiple channel recorder 62 may be digitized for input to a digital computer 78 of either specialized or general purpose type, and the output from computer 78 may be utilized variously to provide the requisite output display data indicating shear wave velocities in the stratigraphy adjacent the borehole.

As an alternative, a multiplexing arrangement may be utilized for transmission of received shear wave or torsional wave data up to the surface installation. Thus, a multiplex stage 80 may be disposed within the circuitry packet within logging tool 10 to receive outputs from one or two receiver arrays for transmission up the logging cable 16. A suitable switching mechanism, either remotely or synchronously controlled, would then fire the sweep at the transitter station such that selected receiver stations would be transmitted and recorded in sequence until all of the receiver stations had been utilized. After all the receiver stations are recorded, the logging tool is then moved to a new depth and the logging sequence is repeated. This may be carried out with a simple form of multiplex circuit 80 under control of a suitable sampling rate control 82 and demultiplex circuit 84 located at the surface. Output of the demultiplex receiver data may then be applied via line 86 for input to the surface recorder 62. Also, if desired, the signal generator may be disposed within the logging tool 10 as by signal generator 88 when actuated by surface control to provide control signal replica through multiplex circuit 80 and demultiplexer 84 to multiple channel recorder 62.

As shown in FIGS. 3 and 4, the logging tool 10 may take the form of conventional forms of downhole sonde instrument. The logging tool 10 consists of an upper frame housing 22 and a lower frame housing 24 which are joined by an acoustic decoupling member 26, a suitable molded length formed from epoxy with lead granules, fiber, etc. in suspension. The acoustic decoupler 26 prevents transmission of interference via the body of logging tool 10 between transmitters 34 and the above-located receiver elements 38, 40, etc. The hydraulic packers 28, 30 and 32 may be suitably actuated by surface control signal to energize a packer actuator valve 100 functioning in coaction with a hydraulic supply 102 as contained within a selected void space of the logging tool frame housing. Such remotely controlled packer actuation and hydraulic circuitry is well-known in the art.

Each of the quadrature arrayed transmitters 34 and the above-located receivers 38, 40, etc., are controlled hydraulically by synchronized piston actuation of their associated telescopic cylinders. An axial piston rod 104 having pistons 106 and receiver pistons 108, 110, 112, etc. is arranged for hydraulic coaction within respective central cylinders 114, 116, 118, 120 etc. for positional actuation of the quadrature arrayed transmitters and receivers. Thus, each of the quadrature arrayed transmission and reception elements is identical to the hydraulic arrangement of FIG. 4 wherein the receivers 40 are illustrated.

Each of the telescopic cylinders 48 in the quadrature array consists of a thrust shaft 122 rigidly supporting the respective receiver or transmitter, in this case transmitter 40, and thrust shaft 122 is hydraulically extendable from within an intermediate cylinder 124 which, in turn, is extendable within a primary cylinder 126 as hydraulically energized via port 128 in communication with the underside of piston 110 in central cylinder 118. Each one of the quadrature arrayed telescopic cylinders 36, 46, 48 and 52 operate simultaneously in identical manner in response to actuation of their respective central cylinders 114, 116, 118 and 120 by displacement of pistons 106, 108, 110 and 112 with axial piston rod 104. Hydraulic actuation of the central cylinders 114–120 is effected in unison utilizing the self-contained hydraulic supply 102 under control of a control valve 130 as it may be suitably actuated from a surface control position to effect operational positioning of the logging tool 10.

The operation of the present invention is carried out utilizing the conventional borehole logging practices wherein the surface-controlled downhole operation is effected at successively increasing depth positions of the sonde. Thus, at each selected depth, the hydraulic control valve 130 (FIG. 3) may be actuated to position the axial piston rod 104 so that all transmitters 34 and the respective receivers 38–44 are positioned in firm contact with the sides of the well bore. Thereafter, surface actuation provides output from signal generator 54 downhole to driver 58 (see FIG. 2) to energize each of the shear/torsional wave transmitters 34, and each of the quadrature arrayed receivers 38–44 pickup the received seismic wave energy for transmission via control cable 16 and recording at multiple channel recorder 62. Thereafter, correlation is applied to each of the received signals relative to its original transmitter control signal thereby to derive an indication of seismic wave travel time. While the correlation technique in itself offers high resolution relative to a composite received signal as correlated with the transmitted control signal replica, the invention utilizes a sweep of supersonic frequencies over at least two octaves in a relatively high frequency range up to about 80 kilohertz, thus further sharpening resolution of the output result. Further, by hydraulically actuating each of the transmitters and the circumferentially arrayed receivers into firm contact with the borehole wall, other interference effects due to fluid and boundary wave motion are eliminated from the output data to further define the output result.

Implementation of the present system should give best results when the multiplex type of received signal transmission is utilized. In general, the useful output of receivers 38–44 is contained in about the first 400 microseconds after pulse initiation plus the sweep length. Assuming that a sweep four to five times the signal length is used, about two milliseconds of received signal containing frequencies up to 80 kilohertz would then be processed. If such received signals are to be transmitted up several thousand feet of cable, it would be best to utilize multiplexing stage 80 in the logging tool 10 with digital signal transmission via coaxial cable 16a to the surface position; data surface memory could then be placed in core memory of digital computer 78 with subsequent correlation also being carried out in computer 78.

The foregoing discloses a novel form of downhole logging tool which utilizes shear/torsional wave transmitters and receivers under control of specific sweep frequency and higher supersonic ranges, and the apparatus utilizes subsequent correlation of transmitter versus receiver signals to define a concise travel time per selected distance within the borehole. The invention has the advantages of direct input of shear wave energy into the formation adjacent a borehole, and such direct contact from the borehole wall serves to increase the shear or torsional wave signal-to-noise ratio as seen by the multiple of receivers. Further, the use of correlation techniques improves the discrimination time of the shear/torsional wave arrival times while the use of multiple units at both the transmitting and receiving stations tends to improve the overall accuracy of the data; that is, if the borehole conditions are not concentric then the composited signal will at least be an average of all received signals.

Changes may be made in combination and arrangement of elements as heretofore set forth in the specification and shown in the drawings; it being understood that changes may be made in the embodiments disclosed without departing from the spirit and scope of the invention as defined in the following claims.

We claim:

1. Apparatus for shear wave logging of a borehole formed in the earth surface, comprising:
    frame means for controlled suspension down said borehole;
    four quadrature arrayed shear wave transmitters carried by said frame means at a first position along said frame means and actuatable between a retracted position and firm contact with the borehole wall;
    four quadrature arrayed shear wave receivers carried by said frame means at a second position spaced by a selected vertical distance from said first position and actuatable between a retracted position and firm contact with the borehole wall and providing a receiver signal output;
    control means generating a control signal of selected frequency and duration for energization of each of said shear wave transmitters;
    recording means receiving signal output from each of said shear wave receivers;
    correlator means correlating the control signal with each respective signal output from the recording means to provide output indication of shear wave travel time over the selected vertical distance; and
    hydraulic actuation means controllable to actuate said transmitters and receivers simultaneously to enable selected progressive positioning of said frame means along said borehole.

2. Apparatus as set forth in claim 1 which is further characterized to include:
    four quadrature arrayed additional shear wave receivers carried by said frame means at a third position spaced a selected vertical distance from said second position and actuatable between a retracted position and firm contact with the borehole wall to provide received shear wave signal output for input to said recording means.

3. Apparatus as set forth in claim 1 wherein said control signal comprises:
    a unique signal sweeping between approximately 20 and 80 kilohertz.

* * * * *